US007288129B2

(12) United States Patent
Oh et al.

(10) Patent No.: US 7,288,129 B2
(45) Date of Patent: Oct. 30, 2007

(54) CYCLONE DUST COLLECTOR AND HANDLE ASSEMBLY FOR VACUUM CLEANER HAVING THE SAME

(75) Inventors: Jang-keun Oh, Gwangju (KR); Jung-gyun Han, Busan (KR); Hyun-ju Lee, Jeonju-si (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 549 days.

(21) Appl. No.: 10/857,892

(22) Filed: Jun. 2, 2004

(65) Prior Publication Data

US 2004/0237248 A1 Dec. 2, 2004

(51) Int. Cl.
*B01D 45/12* (2006.01)

(52) U.S. Cl. ........................ 55/426; 55/429; 55/459.1; 55/459.2; 55/DIG. 3; 15/327.1; 15/353

(58) Field of Classification Search ................. 55/337, 55/426, 429, 459.1, 459.2, DIG. 3; 15/327.1, 15/329, 353
See application file for complete search history.

(56) References Cited

U.S. PATENT DOCUMENTS

| | | | | |
|---|---|---|---|---|
| 5,350,432 | A | 9/1994 | Lee | |
| 6,766,558 | B1 * | 7/2004 | Matsumoto et al. | 15/353 |
| 2002/0066262 | A1 | 6/2002 | Oh | |
| 2002/0133901 | A1 | 9/2002 | Ohta et al. | |

FOREIGN PATENT DOCUMENTS

| | | |
|---|---|---|
| DE | 10142016 B4 | 5/2004 |
| EP | 1 443 494 | 7/1976 |
| EP | 0 082 422 A1 | 6/1983 |
| EP | 1 199 023 A1 | 4/2002 |
| GB | 2 370 978 | 7/2002 |
| JP | 51-103872 | 2/1975 |
| JP | 2002-172077 | 6/2002 |
| JP | 2002-315701 | 10/2002 |
| JP | 2002-326041 | 11/2002 |
| JP | 2003-210368 | 7/2003 |
| JP | 2003-210369 | 7/2003 |
| JP | 2003-319897 | 11/2003 |
| JP | 2004012690 A | 1/2004 |
| JP | 2004-33313 | 2/2004 |

(Continued)

OTHER PUBLICATIONS

Combined Search and Examination Report under Sections 17 and 18(3) dated Oct. 11, 2004.

(Continued)

*Primary Examiner*—Robert A. Hopkins
(74) *Attorney, Agent, or Firm*—Blank Rome LLP

(57) ABSTRACT

Disclosed is a handle assembly of a vacuum cleaner, comprising a handle pipe having an inlet and an outlet fluidly connected to a suction port assembly and a cleaner body, respectively, a handle formed on the handle pipe to grip for a cleaning work, and a cyclone dust collector protruded at one side of the handle pipe to centrifugally separate dust from an external air flowed in through the inlet of the handle pipe, and discharge a clean air to the outlet of the handle pipe. Accordingly, the cyclone dust collector can be used even in a state that an auxiliary suction tool is connected to the handle assembly.

36 Claims, 9 Drawing Sheets

FOREIGN PATENT DOCUMENTS

| | | | |
|---|---|---|---|
| KR | 10-2002-0056305 | | 7/2002 |
| KR | 20020056307 | | 7/2002 |
| KR | 1020020056307 | A | 7/2002 |
| WO | WO 97/35509 | | 10/1997 |

OTHER PUBLICATIONS

Official Action Issued by Russian Patent Office.

Chinese Patent Office, Office Action Issued Dec. 9, 2005 with respect to corresponding Chinese Patent Application No. 200410049224.8 filed on Jun. 2, 2004.

Australian Patent Office, Office Action issued Jan. 12, 2006 with respect to Australian Patent Application No. 2004202416 filed on May 31, 2004.

Korean Patent Office, Office Action issued Feb. 10, 2006 with respect to Korean Patent Application No. 2004-26273 filed on Apr. 16, 2004.

French Patent Office, Preliminary Search Report issued Apr. 3, 2006 with respect to French Patent Application No. 0405961 filed on Jun. 2, 2004.

Spanish Patent Office, State of the Art dated Apr. 5, 2006 with respect to Spanish Patent Application No. 0405961 filed on Jun. 1, 2004.

German Patent Office, Office Action issued Jun. 8, 2006 with respect to German Patent Application No. 1002004026768.5 filed on Jun. 2, 2004.

Canadian Patent Office, Office Action issued Aug. 15, 2006, with respect to Canadian Patent Application No. 2,469,705 filed May 31, 2004.

Office Action Issued by Russian Patent Office, Aug. 7, 2006.

Japanese Patent Office, Japanese Office Action issued Jan. 30, 2007 with respect to Japanese Patent Application No. 2004-1633929 filed on Jun. 1, 2004.

* cited by examiner

CYCLONE DUST COLLECTOR AND HANDLE ASSEMBLY FOR VACUUM CLEANER HAVING THE SAME

CROSS-REFERENCE TO RELATED APPLICATIONS

This application claims the benefit of Korean Patent Applications No. 2003-35227 filed Jun. 2, 2003, and No. 2004-26273 filed Apr. 16, 2004 in the Korean Intellectual Property Office, the disclosure of which is incorporated herein by reference.

FIELD OF THE INVENTION

The present invention relates to a vacuum cleaner, and more particularly, to a handle assembly disposed on a suction path which connects a cleaner body and a suction port assembly, and a cyclone dust collector.

BACKGROUND OF THE INVENTION

Referring to FIG. 1, a general conventional canister-type vacuum cleaner comprises a cleaner body 100 having a vacuum generator, a suction port assembly 110 sucking in dust of cleaning surface when the vacuum generator is driven, an extension pipe 120 connected to the suction port assembly 110, a flexible hose 130 connected to the cleaner body 100 in fluid communication with the vacuum generator, a handle assembly 140 disposed between the extension pipe 120 and the flexible hose 130 and having a handle 141 and an operation switch 145, and a cyclone dust collector 150 disposed between the handle assembly 140 and the extension pipe 120 to centrifugally separate an external air sucked in through the suction port assembly 110.

In addition, the vacuum cleaner may further comprise an auxiliary suction tool 170 of various shapes, such as a crevice tool, according to a shape of the cleaning surface. The auxiliary suction tool 170 can be connected to the extension pipe 120 instead of the suction port assembly 110, or connected to the handle assembly 140 instead of the extension pipe 120.

In case of the vacuum cleaner in which the cyclone dust collector 150 is disposed between the extension pipe 120 and the handle assembly 140, as described above, there is no remarkable inconvenience in connecting the auxiliary suction tool 170 instead of the suction port assembly 110 to the extension pipe 120. However, when the auxiliary suction tool 170 is connected instead of the extension pipe 120 to the handle assembly 140, it is troublesome to use.

That is, in a state that the cyclone dust collector 150 is connected to the handle assembly 140, if the auxiliary suction tool 170 is directly connected to the cyclone dust collector 150, a dust receptacle 160 which is longer than the auxiliary suction tool 170 xmay obstruct the auxiliary suction tool 170 from the cleaning surface.

In addition, when the auxiliary suction tool 170 is connected after the cyclone dust collector 150 is separated from the handle assembly 140, cleaning efficiency is deteriorated due to an absence of the cyclone dust collector 150.

Recently, vacuum cleaners are coming into the market, which do not comprise separate dust collector besides the cyclone dust collector 150. Therefore, a vacuum cleaner capable of using the auxiliary suction tool 170 and the cyclone dust collector 150 at the same time, has been required.

SUMMARY OF THE INVENTION

In order to overcome the above-mentioned problems, it is an aspect of the present invention to provide a vacuum cleaner of an improved structure, which enables the use of a cyclone dust collector during the use of an auxiliary suction tool, and a handle assembly comprising the same.

In order to achieve the above-described aspects of the present invention, there is provided a handle assembly for a vacuum cleaner, comprising a handle pipe having an inlet connected to a suction port assembly so that an air can flow therethrough, and an outlet connected to a cleaner body so that the air can flow therethough, a handle formed on the handle pipe for a user to grip when cleaning a cleaning surface, and a cyclone dust collector protruded from the handle pipe to centrifugally separate dust from an external air sucked in through the inlet of the handle pipe, and discharge a clean air to the outlet of the handle pipe.

By the presence of the above handle assembly, cleaning efficiency is improved since the cyclone dust collector can be used although an auxiliary suction tool is directly connected to the suction port assembly.

According to an embodiment of the present invention, an end of the cyclone dust collector faces downstream of the handle pipe which is formed along the suction path connecting the suction port assembly and the cleaner body.

The handle pipe comprises a first tube connecting the inlet of the handle pipe and an inside of the cyclone dust collector to let the air through, a second tube connecting the outlet of the handle pipe and the inside of the cyclone dust collector to let the air through, and a partition mounted in the handle pipe to separate the first and the second tubes from each other inside the handle pipe.

Meanwhile, the cyclone dust collector comprises a cyclone body connected to a side of the handle pipe, and having a cyclone inlet connected to the first tube, and a cyclone outlet connected to the second tube, and a dust receptacle removably connected to the cyclone body to form a cyclone chamber which is a space for centrifugal separation of the external air, and having an free end which directs toward the downstream side with respect to the handle pipe along the suction path when the dust receptacle is connected to the cyclone body.

The cyclone body comprises a casing having an open end connected with the dust receptacle, and forming a space for the cyclone chamber therein when being connected to the dust receptacle. An inlet at one side of the casing is connected to the first tube through an inflow pipe so that the air flowed in the cyclone chamber is guided in a tangential direction to the casing. The inflow pipe is formed such that a section area is gradually narrowing from the inlet connected to the first tube toward the outlet connected to the cyclone dust collector.

The cyclone dust collector has a dust separation plate formed therein to divide the cyclone chamber into a first chamber and a second chamber, and it is preferable that the cyclone body and the dust receptacle are disposed in a serial arrangement along a central axis which is sloped with respect to the handle pipe.

Here, it is preferable that the dust separation plate is mounted in the casing at a predetermined slope with respect to an inner circumference of the casing in the vicinity of the open end, and having an escape hole penetrating a side thereof such that the dust separated in the first chamber is discharged to the second chamber.

The dust separation plate is slopingly mounted so that a side having the escape hole is nearer to the end of the dust receptacle than the other side.

Here, it is preferable that the dust receptacle is mounted substantially in parallel with the second tube when connected to the cyclone body.

According to another embodiment of the present invention, the cyclone dust collector is partially bent such that a part thereof connected to the handle pipe and the end of the dust receptacle are slopingly connected to each other. Further, a part of the casing in the vicinity of the open end is bent.

The cyclone dust collector comprises a dust separation plate which divides the cyclone chamber into a first chamber and a second chamber, and an escape hole for the dust separated in the first chamber to flow into the second chamber.

The escape hole is penetratingly formed at a side of the dust separation plate, and the dust separation plate is slopingly mounted so that a side having the escape hole is nearer to the end of the dust receptacle than the other side.

The casing comprises a first casing connected to the handle pipe in a cantilever type, and a second casing connected to a free end of the first casing, the free end of the first casing is disposed in the second casing from an inner circumference of the second casing, and the dust separation plate covers the end of the first casing in the second casing.

The escape hole penetrates an outer circumference of the first casing which is connected to the dust separation plate, and disposed in the second casing, at a side of the outer circumference which is nearest to the free end of the dust receptacle.

The first and the second casing, and the dust separation plate are integrally formed altogether. The dust receptacle is mounted in parallel with the second tube when connected to the cyclone body.

According to yet another embodiment of the present invention, the handle assembly further comprises an assistant connection unit for connecting the dust receptacle to the handle pipe in a slidable and removable manner when the dust receptacle is connected to and separated from the casing.

The assistant connection unit comprises a slide projection protruded from a side of one of the handle pipe and the dust receptacle, and a slide groove removably connected to the slide projection, and formed at a side of the other one of the handle pipe and the dust receptacle to support the slide projection slidably when connected to the slide projection.

According to yet another embodiment of the present invention, the handle assembly further comprises a tubbish inner casing mounted in the casing and connected to the cyclone outlet by an upper portion thereof, a grill member connected to a bottom portion of the inner casing, and an air inducing wall disposed around outside of the inner casing to guide downward the air flowed in through the cyclone inlet of the cyclone body.

The air inducing wall is spirally and gradually sloping down, and the handle assembly may further comprise an insertion opening integrally formed with a top surface of the air inducing wall, and fitted in with the cyclone inlet.

The grill member comprises a substantially cylindrical grill body having a plurality of pores, and a skirt flanged around a bottom portion of the grill body, the skirt having a partial cut in a circumferential direction. The skirt has a slant sloping down toward the cut in the circumferential direction.

In the above-structured handle assembly, the dust receptacle further comprises a dust flow prevention member mounted therein. Preferably, the dust flow prevention member comprises a board member protruded into the dust receptacle in a length direction of the dust receptacle, and is sloped in a manner that the protruded height increases toward the end of the dust receptacle.

It is preferable that the cyclone body and the dust receptacle are made of a transparent material, and the cyclone body and the handle pipe are integrally formed. Further, the handle pipe is fluidly communicated with the suction port assembly through the extension pipe, and with the cleaner body through the flexible hose.

According to another aspect of the present invention, a cyclone dust collector disposed on a suction path which connects a cleaner body having a vacuum generator and a suction port assembly sucking in dust from a cleaning surface, to centrifugally separate the air sucked in through the suction port assembly, comprising a cyclone body formed at a handle assembly connecting an extension pipe which is connected to the suction port assembly and a flexible hose which is connected to the cleaner body, and a dust receptacle removably connected to the cyclone body, wherein an end of the dust receptacle faces the downstream side with respect to the handle assembly formed along the suction path.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
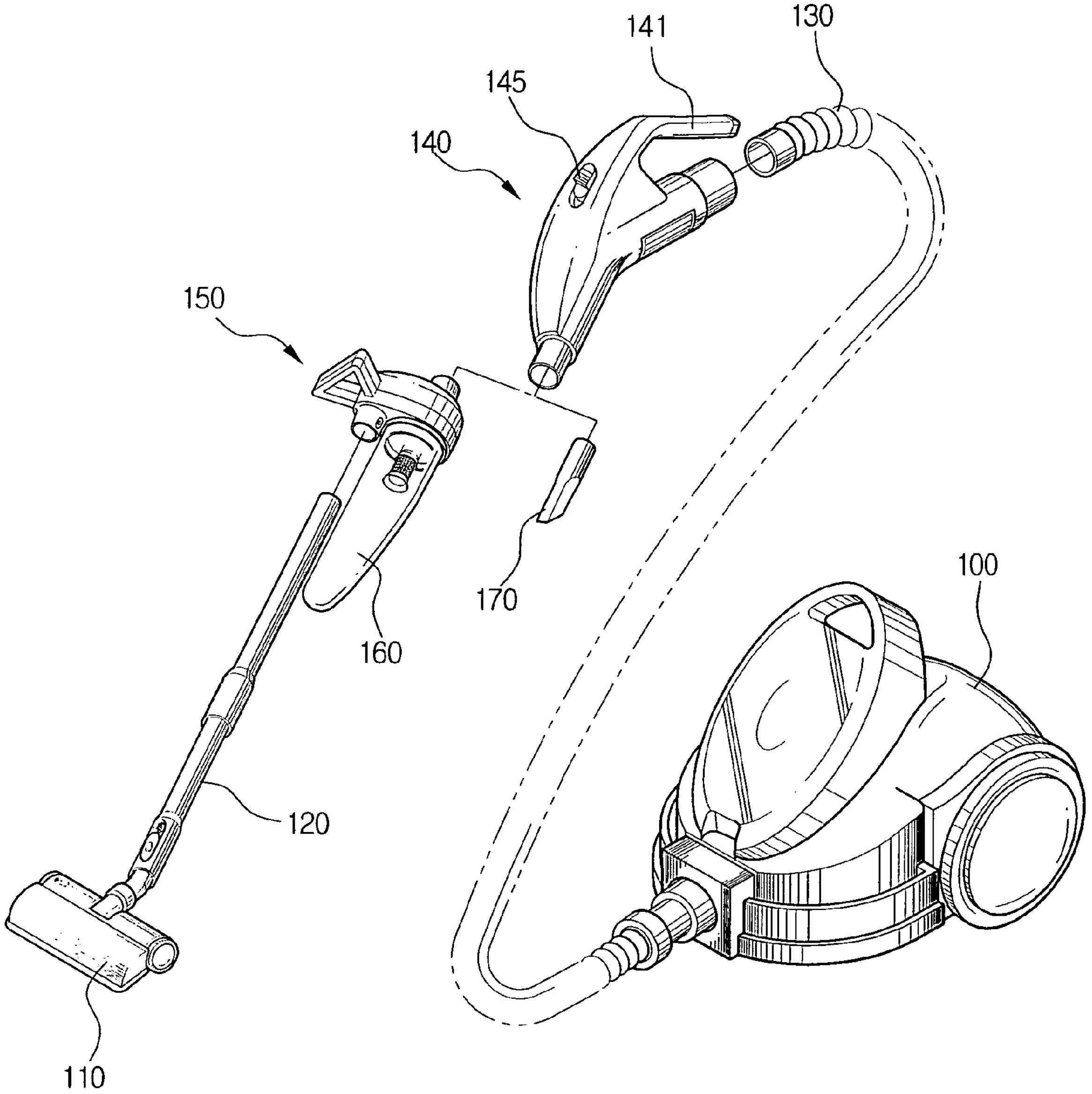
FIG. 1 (PRIOR ART)
FIG. 1 is an exploded perspective view of a general conventional vacuum cleaner.

Hereinafter, preferred embodiments of the present invention will be described in detail with reference to the accompanying drawings. Further, in referring to the elements having the same structure and operation as in the conventional vacuum cleaner of FIG. 1, the elements will be cited by the same reference numerals throughout.

Figure 2:
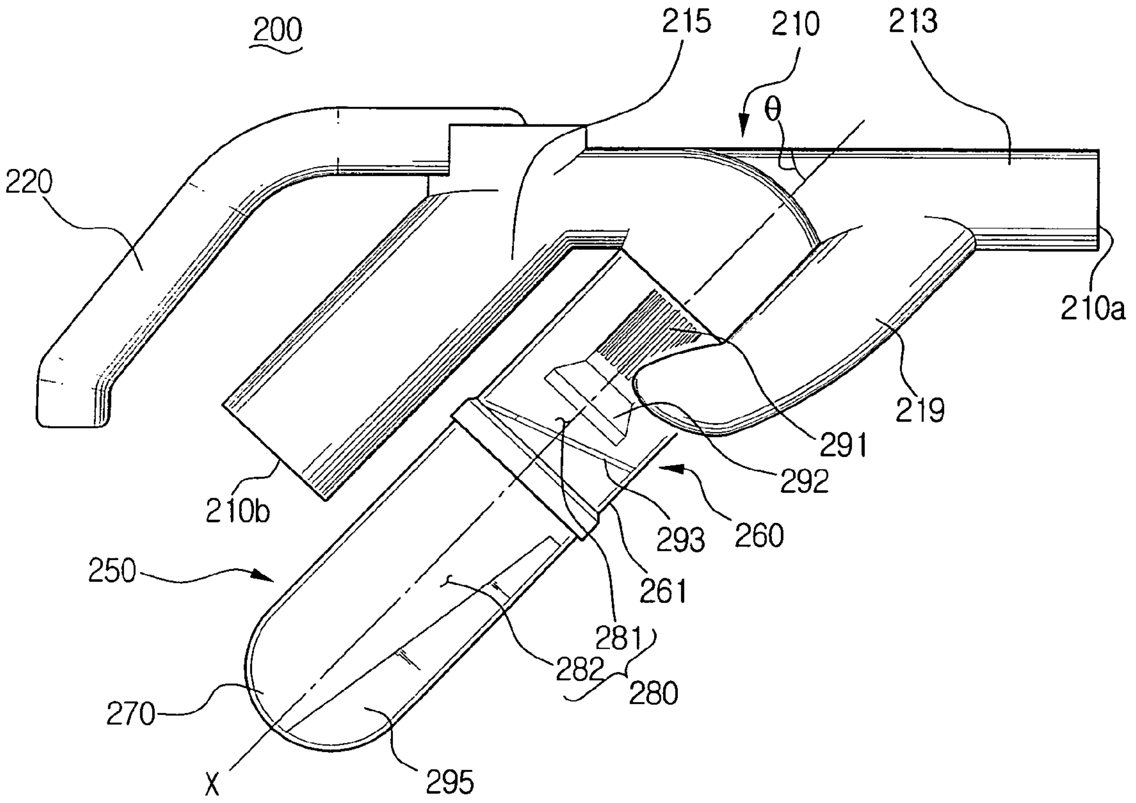
FIG. 2 is a side view of a handle assembly according to a first embodiment of the present invention.
Figure 3:
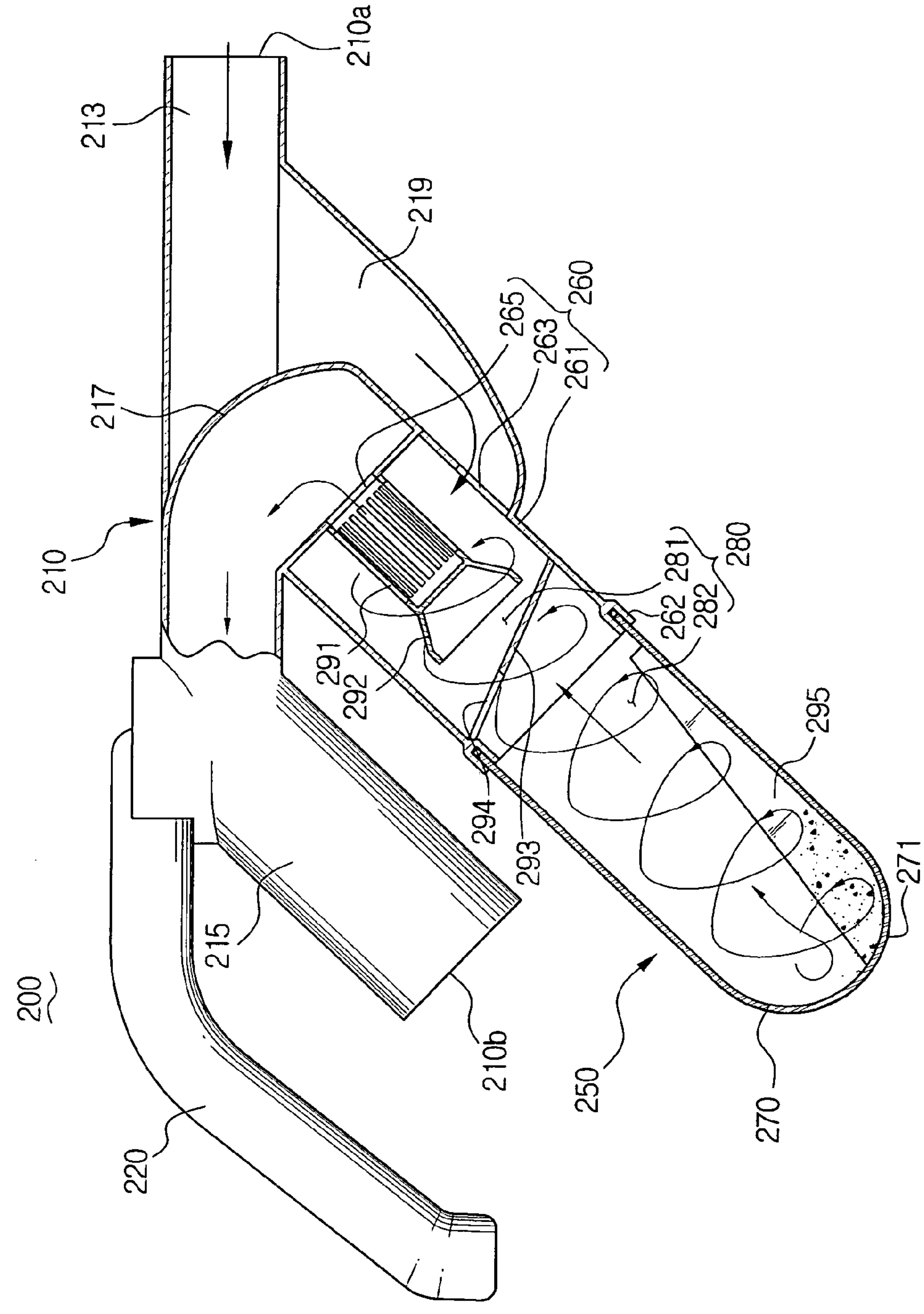
FIG. 3 is a sectional view showing that the handle assembly of FIG. 2 is in use.

FIGS. 2 and 3 show a handle assembly 200 according to a first embodiment of the present invention. Referring to the drawings, the handle assembly 200 according to an embodiment of the present invention comprises a handle pipe 210, a handle 220, and a cyclone dust collector 250.

The handle pipe 210 has an inlet 210*a* and an outlet 210*b* at both ends thereof. The inlet 210*a* and the outlet 210*b* are removably mounted on a suction path that connects a suction port assembly 110 (FIG. 1) and a cleaner body 100 (FIG. 1). In general, the inlet 210*a* of the handle pipe 210 is connected to the suction port assembly 110 passing through the extension pipe 120 (FIG. 1) so that an air can flow therethrough. The outlet 210*b* of the handle pipe 210 is connected to the cleaner body 100 passing through the flexible hose 130 (FIG. 1) so that an air can flow therethrough. At an end of the handle pipe 210, a handle 220 is formed for a user to grip when cleaning a cleaning surface.

The cyclone dust collector 250 which will be described later is mounted at a side of the handle pipe 210 protruded in a shape of a cantilever. Therefore, the handle pipe 210 further comprises a first tube 213, a second tube 215 and a partition 217, for the mounting of the cyclone dust collector 250.

The first tube 213 connects the inlet 210*a* of the handle pipe 210 and a cyclone chamber 280 of the cyclone dust collector 250. The second tube 215 connects the outlet 210*b* of the handle pipe 210 and an outlet 265 of the cyclone dust collector 250. The partition 217 is mounted in the handle pipe 210 to separate the first and the second tubes 213, 215 from each other inside the handle pipe. The first tube 213 is connected to an inlet 263 of the cyclone dust collector 250 via an inflow pipe 219. By way of an example, the inflow pipe 219 according to the present embodiment is formed in which the section area gradually decreases toward the cyclone body 260 so that the centrifugal separation efficiency is improved by speeding up the air flow in the cyclone chamber 280.

As described above, the cyclone dust collector 250 mounted at the handle pipe 210 is for centrifugally separating dust from the dust-laden external air sucked in through the suction port assembly 110, and has the cyclone body 260 and a dust receptacle 270.

The cyclone body 260 is slantingly connected to the side of the handle pipe 210. The cyclone body 260 comprises the cyclone inlet 263 which is connected to the first tube 213, and the cyclone outlet 265 which is connected to the second tube 215. The cyclone inlet 263 is for the external air to flow in, and the cyclone outlet 265 is for the clean air in which the dust is separated in the cyclone chamber 280 to be discharged. The cyclone body 260 also comprises a cylindrical casing 261 having a space inside. When the cylindrical casing 261 is connected to the dust receptacle 270, the space becomes a part of the cyclone chamber 280 that centrifugally separates the external air. The cyclone body 260 can be removably connected to the handle pipe 210, however, only the cyclone body 260 integrally formed with the handle pipe 210 will be explained in this embodiment.

The dust receptacle 270 is removably connected to an open end of the casing 261. A free end of the dust receptacle 270 directs toward downstream of the handle pipe 210 along the suction path connecting the suction port assembly 110 and the cleaner body 100. It is preferable that the dust receptacle 270 is disposed parallel to the second tube 215 of the handle pipe 210 when being connected to the cyclone body 260. According to the above structure, although the user cleans the cleaning surface by connecting the auxiliary suction tool 170 (FIG. 1) to the inlet 210*a* of the handle pipe 210, the dust receptacle 270 does not hinder the cleaning work.

The cyclone dust collector 250 of the above embodiment comprises a dust separation plate 293, an escape hole 294, a dust flow prevention member 295, and a filter unit 291, to promote dust separation efficiency.

The filter unit 291 separates fine dust from the once-cleaned air which is discharged through the cyclone outlet 265. The filter unit 291 is formed as a grill type in the casing 261 so as to cover the cyclone outlet 265, and has a backflow prevention skirt 292 mounted at a lower part thereof. However, the filter unit 291 can be designed in various types to perform the above function.

The dust separation plate 293 is slantingly mounted in the casing 261 with respect to the casing 261 so that the cyclone chamber 280 is divided into a first chamber 281 and a second chamber 282. The first chamber 281 is a space for centrifugally separating the external air, and the second chamber 282 is a space for keeping the dust separated from the first chamber 281. By the presence of the dust separation plate 293, the dust stacked in the second chamber 282 is prevented from flowing back toward the cyclone outlet 265 together with the clean air flowed to the cyclone outlet 265. The dust separation plate 293 can be designed in various types to perform the above function.

The escape hole 294 is for letting the dust separated in the first chamber 281 flow in the second chamber 282. The escape hole 294 in this embodiment is formed by penetrating one side of the dust separation plate 293 at the farthest side from the filter unit 291.

The dust flow prevention member 293 prevents the fine dust in the second chamber 282 from floating by the air flow, and is formed as a board member protruded in a length direction of the dust receptacle 270. Further, it is preferable that the dust flow prevention member 293 is sloped in a manner that the protruded height increases toward the end of the dust receptacle 270, so that the dust flow can be effectively prevented.

Preferably, the cyclone body 260 and the dust receptacle 270 of the above cyclone dust collector 250 are made of a transparent material to be seen through for the user's check. Accordingly, management of the cyclone dust collector 250 becomes more convenient.

Figure 4:
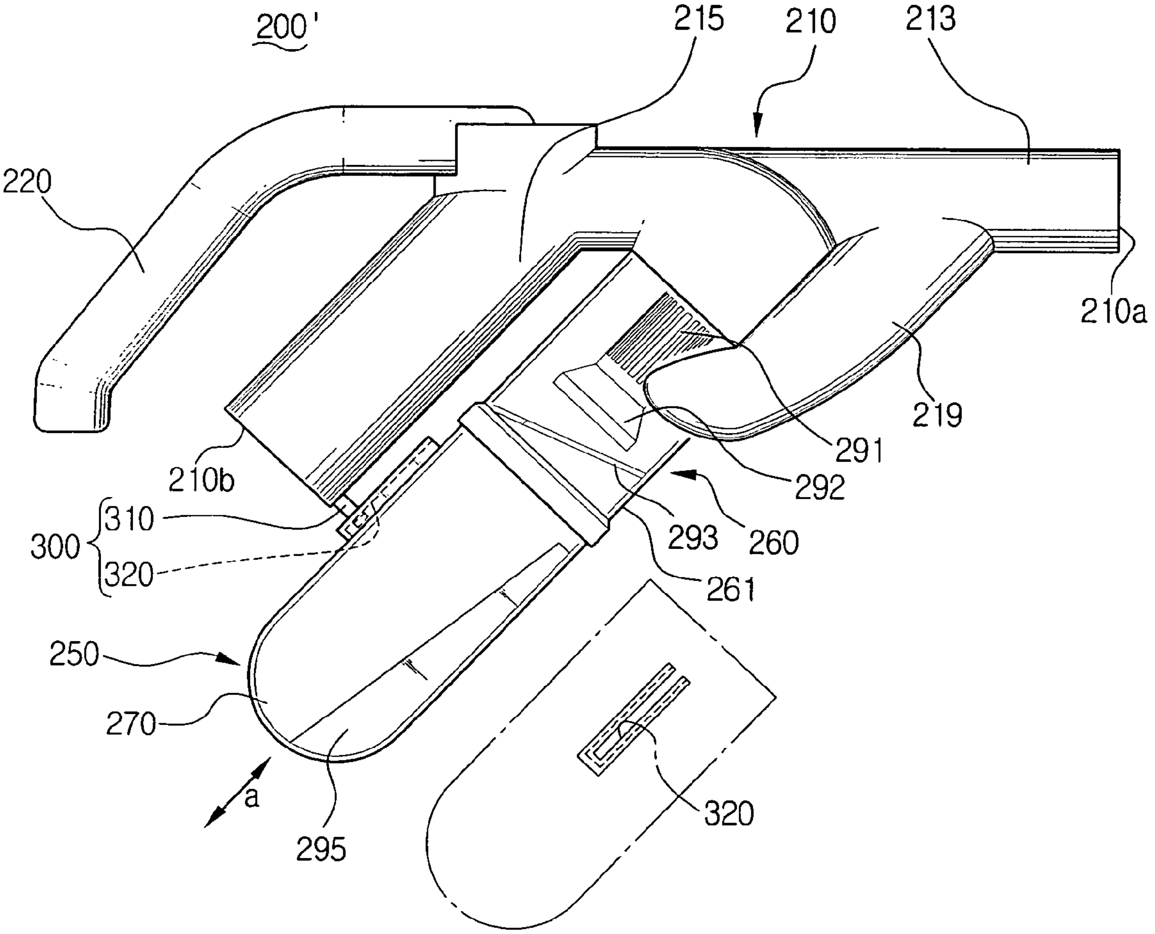
FIG. 4 is a side view of a handle assembly according to a second embodiment of the present invention.

FIG. 4 shows a handle assembly 200 for a vacuum cleaner according to a second embodiment of the present invention. The handle assembly 200 temporarily supports the dust receptacle 270 when connecting/separating the dust receptacle 270 to/from the cyclone body 260. The handle assembly 200 further comprises an assistant connection unit 300 to prevent separation of the cyclone dust collector 250 by supporting the weight of the dust receptacle 270 when filled with the dust.

The assistant connection unit 300 of this embodiment connects the dust receptacle 270 to the handle pipe 210 in slidable and removable manner when the dust receptacle 270 is connected to and separated from the casing 261. For this, the assistant connection unit 300 comprises a T-shaped slide projection 310 protruded from the handle pipe 210, and a sliding groove 320 for the slide projection 310 to be removably and slidably inserted therein. Here, preferably, the slide projection 310 slides in the same direction as the dust receptacle 270 is connected/separated with respect to the cyclone body 260.

The other elements except for the assistant connection unit 300 are the same as the handle assembly 200 of the first embodiment. Therefore, detailed description thereof will be omitted.

Figure 5:
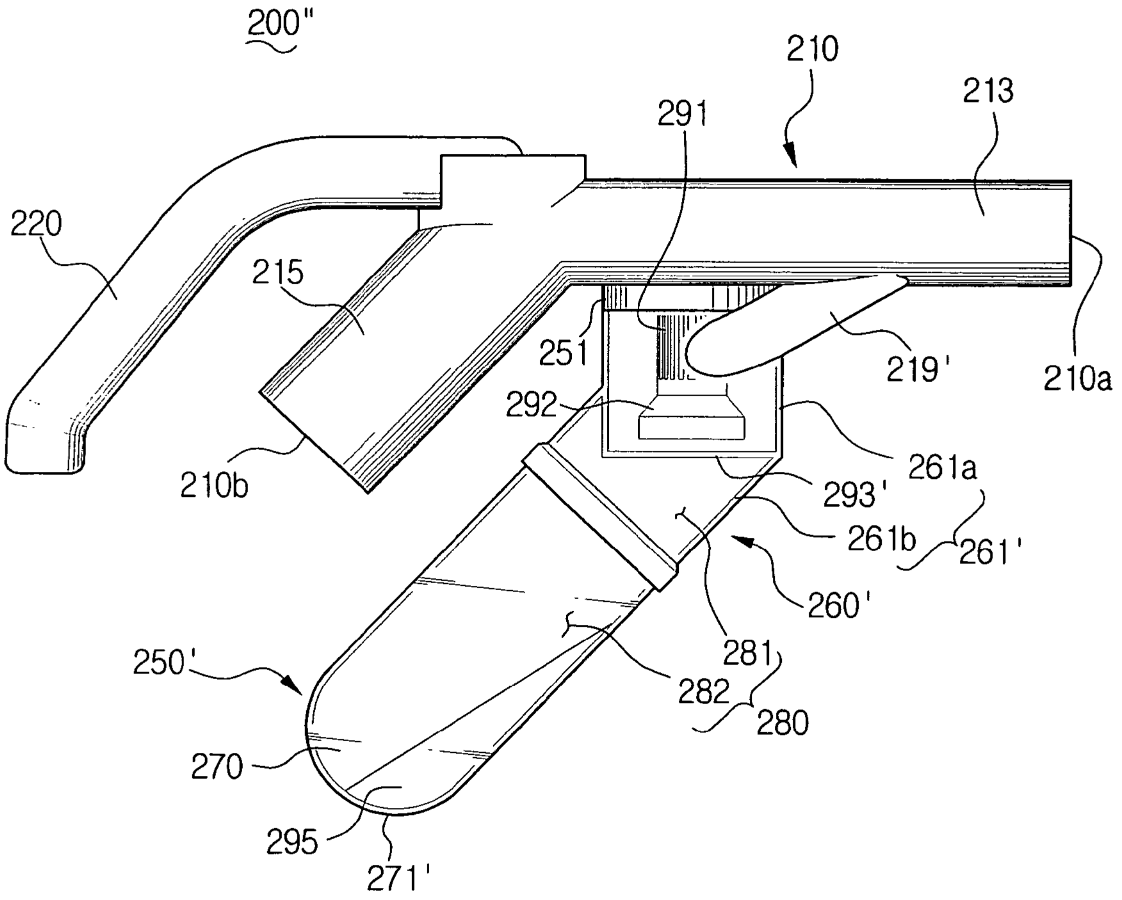
FIG. 5 is a side view of a handle assembly according to a third embodiment of the present invention.
Figure 6:
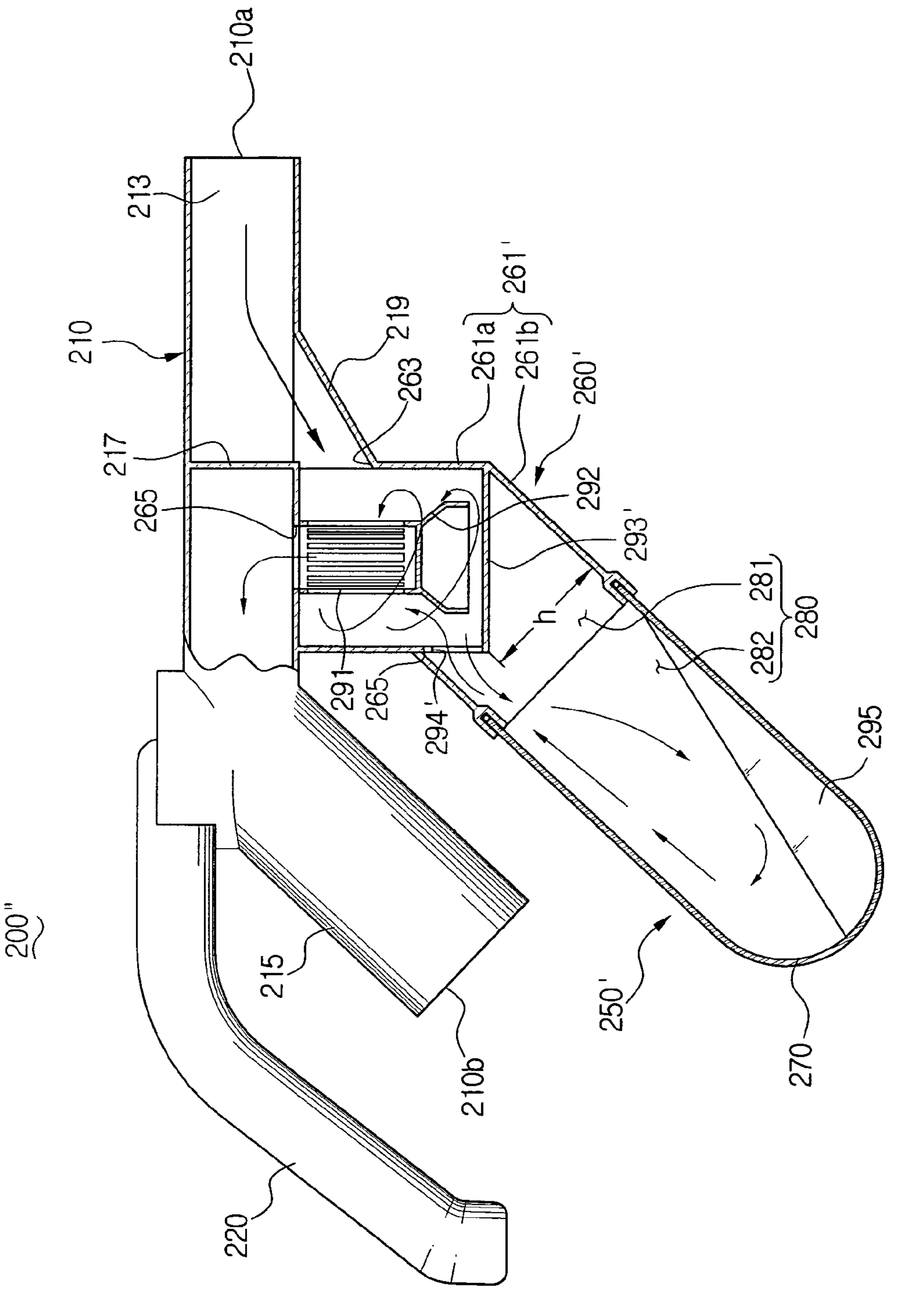
FIG. 6 is a sectional view showing that the handle assembly of FIG. 5 is in use.

FIGS. 5 and 6 show a handle assembly 200 according to a third embodiment of the present invention. While the cyclone body 260 (FIG. 2) and the dust receptacle 270 (FIG. 2) are disposed in a serial arrangement in along a central axis X which is sloped a predetermined angle θ with respect to the handle pipe 210 in the first and the second embodiments, the cyclone dust collector 250' of the handle assembly 200 of the third embodiment is partially bent so that a fixed end thereof and an free end of the dust receptacle 270 form a predetermined angle.

This is to improve a dust collecting efficiency of the cyclone dust collector 250' by enlarging the sloping angle between the cyclone body 260' and the handle pipe 210, and make the end of the dust receptacle 270 direct toward the downstream with respect to the handle pipe 210. In this embodiment, a side of the casing 261' near the open end of the casing 261' is partially bent. Here, it is preferable that the casing 261' and the handle pipe 210 are connected substantially at right angle to each other, and the dust receptacle 270 is disposed in parallel with the second tube 215 when being connected to the casing 261', as in the described embodiments. In addition, albeit not shown, a part of the dust receptacle 270 can be bent, instead of the cyclone body 260', to perform the same function.

For the partially bent cyclone body 260' as described above, the casing 261' of this embodiment comprises a first casing **261*a* and a second casing 261*b*** which are slopingly connected to each other.

The first casing **261*a* is connected to the handle pipe 210 at a predetermined angle with respect to the first tube 213. The second casing 261*b* is slopingly connected to a free end of the first casing 261*a*, and the free end of the first casing 261*a* is protruded a predetermined length in the second casing 261*b*. Here, it is preferable that the second casing 261*b* is slopingly connected with the first casing 261*a* in parallel with the second tube 215 like the dust receptacle 270**.

The handle assembly 200 of the present embodiment may comprise the filter unit 291, a dust separation plate 293', an escape hole 294', the dust flow prevention member 295, as in the other embodiments of the present invention. In addition, albeit not shown, an assistant connection unit 300 (FIG. 4) can be employed as in the second embodiment.

The dust separation plate 293' of the third embodiment, as shown in FIG. 6, covers a lower part of the first casing **261*a*, and is mounted at a predetermined angle with respect to an inner circumference of the second casing 261*b***.

The escape hole 294' can be formed penetrating a side of the dust separation plate 293' as in the other embodiments. However, in this embodiment, the escape hole 294' is connected to a circumference of the dust separation plate 293', while penetrating a sidewall of the first casing **261*a* disposed in the second casing 261*b*. It is preferable that the escape hole 294' is formed at a sidewall of the first casing 261*a*, the sidewall which is nearest from the free end of the dust receptacle 270. Therefore, a dust stacking space as much as a height h, the height from the inner wall of the dust receptacle 270 to the dust separation plate 293'**, can be guaranteed.

It is preferable that the first and the second casings **261*a*, 261*b*, and the dust separation plate 293' of the modified cyclone body 260' are integrally formed altogether. Further, preferably, the cyclone body 260' and the handle pipe 210 are integrally formed. Then, a manufacturing process of the cyclone dust collector 250'** becomes easier.

Figure 7:
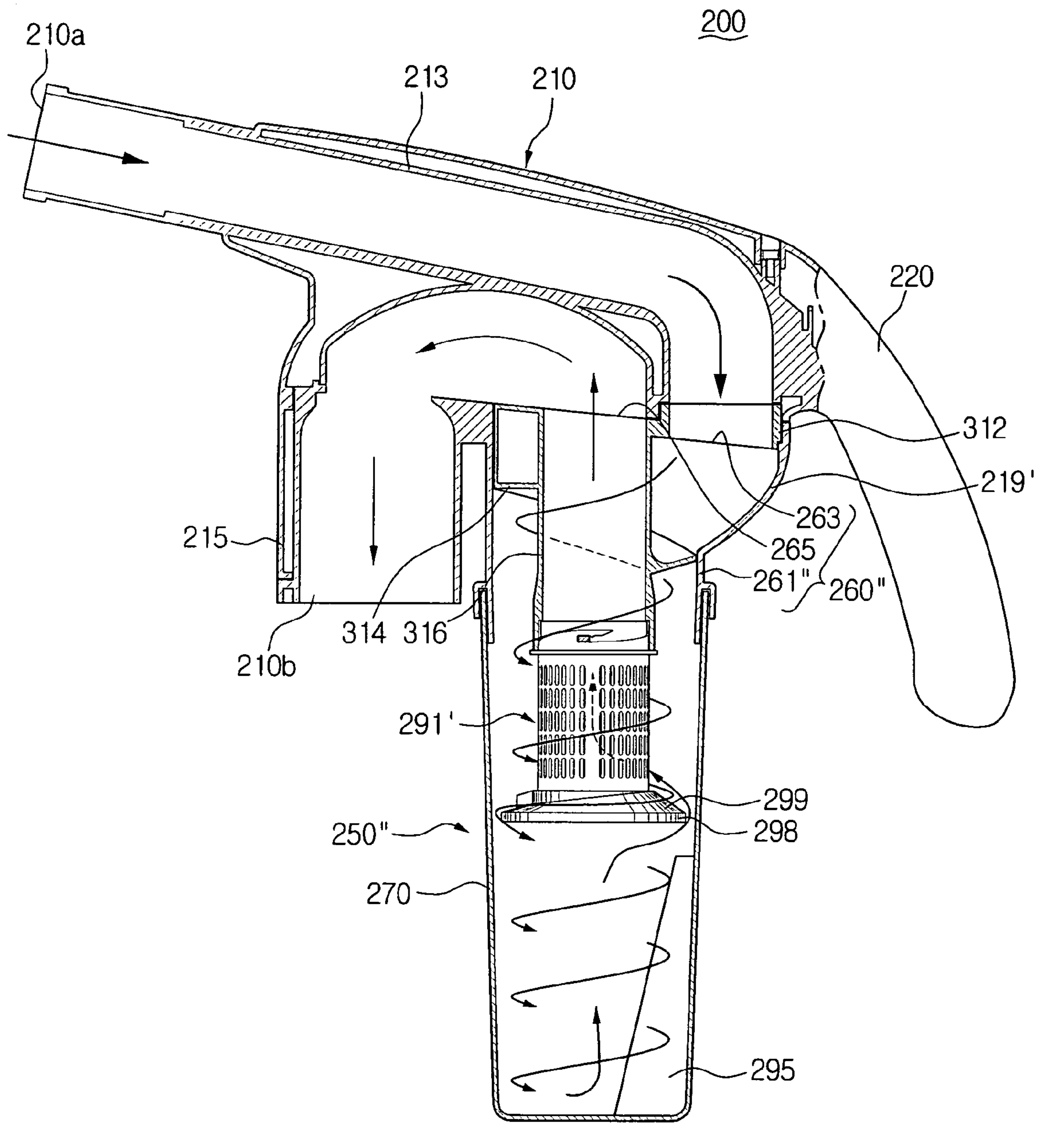
FIG. 7 is a side view of a handle assembly according to a fourth embodiment of the present invention.

FIGS. 7 through 10 illustrate a handle assembly 200 according to a fourth embodiment of the present invention, where a cyclone dust collector 250" is connected between the first tube 213 and the second tube 215. A cyclone body 260" comprises the cyclone inlet 263, the cyclone outlet 265 and cylindrical casing 261" same as in the previous embodiments. However, the cyclone inlet 263 of the cyclone body 260" of the fourth embodiment, as shown in FIG. 7, is directly connected to the first tube 213 while the cyclone inlet 263 of the cyclone body 260 of the previous embodiments is connected to the first tube 213 through the inflow pipe 219 as shown in FIG. 3. Furthermore, since the upper casing 216" comprises an inflow pipe 219', the upper casing 216" does not have a cylindrical shape like the cylindrical casing 261 of the previous embodiments (FIG. 3).

The cyclone dust collector 250" of this embodiment may comprise an inner casing 316, a grill member 291' and an air inducing wall 314 to enhance dust-separating efficiency.

Figure 8:
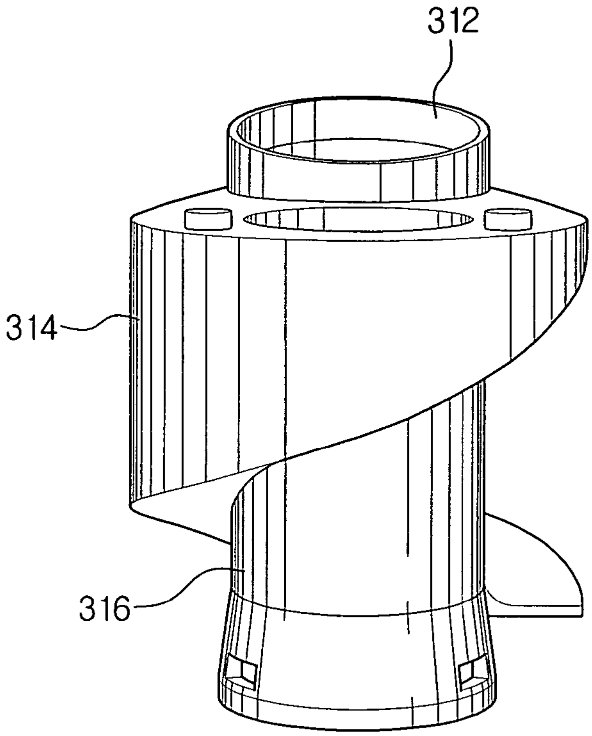
FIG. 8 is a front view of an inner casing and an air inducing wall of FIG. 7.
Figure 9:
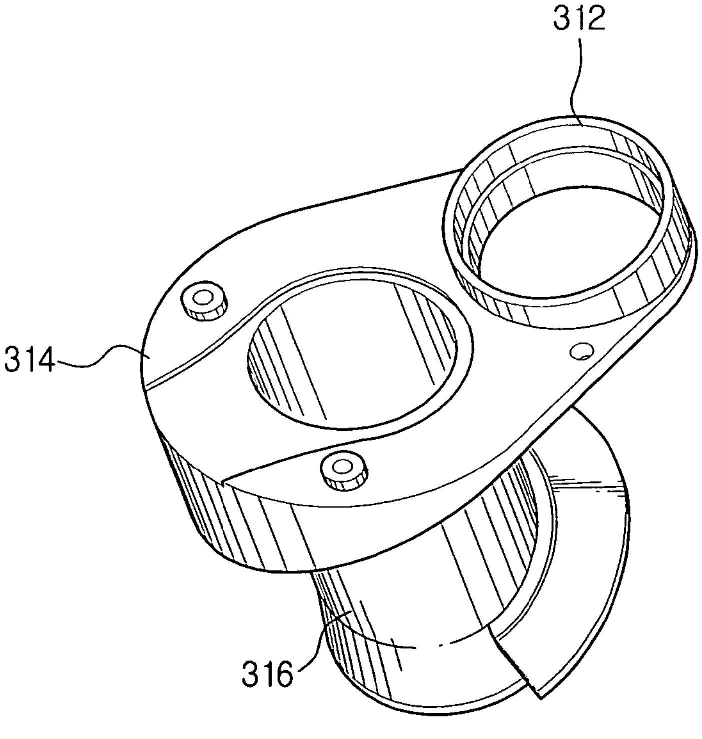
FIG. 9 is a perspective view of FIG. 8.
Figure 10:
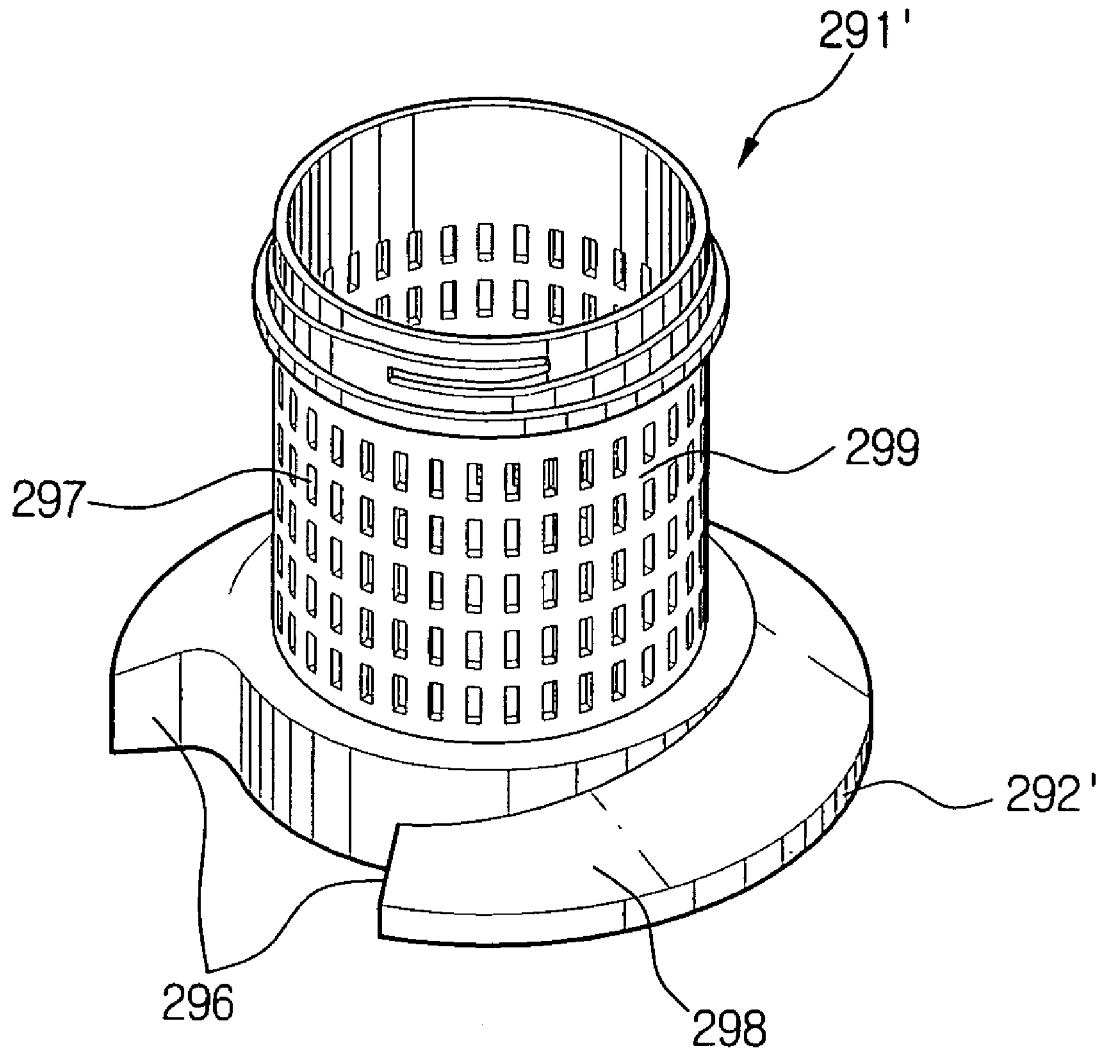
FIG. 10 is a perspective view of a grill member of FIG. 7.

Referring to FIGS. 8 and 9, the inner casing 316 is mounted in the casing 261" of the cyclone body 260". Top and bottom of the casing 261" are open. The upper part of the inner casing 316 is connected with the cyclone outlet 265, and the lower part is connected to the grill member 291' which will be described below.

The air inducing wall 314 is disposed around outside of the inner casing 316 to guide downward the air flowed in through the cyclone inlet 263 of the cyclone body 260". The air inducing wall 314 is formed spirally descending from the outside of the cyclone outlet 265 along a circumference of the inner casing 316 in a predetermined length. An upper portion of the air inducing wall 314 is substantially in a dome configuration, and the lower portion of the air inducing wall 314 is substantially planar. The upper portion of the air inducing wall is connected to the cyclone inlet 263 to guide the air drawn in through the cyclone inlet 263 downward. As the air is guided along the rounded surface of the air inducing wall 314, occurrence of turbulence is restrained, and centrifugal force increases. As a result, dust separating efficiency is improved.

An insertion opening 312, being integrally formed with a top surface of the air inducing wall 314, is fitted in with the cyclone inlet 263. That is, the inner casing 316, the air inducing wall 314 and the insertion opening 312 may be integrally formed altogether. Accordingly, manufacture of the cyclone dust collector 250" becomes easier, and productivity is improved.

The grill member 291' comprises a grill body 299 having a plurality of pores 297, and a skirt 292' attached to a bottom portion of the grill body 299. The grill body 299 is substantially shaped as a cylinder of which a top is open. The upper portion of the grill body 299 is connected to the lower part of the inner casing 316. The bottom portion of the grill body 299 is blocked, and the skirt 292' is flanged around the outer circumference of the bottom portion.

The skirt 292' has a diameter smaller than an inner diameter of the casing 261", and larger than an outer diameter of the grill body 299. The skirt 292' prevents backflow of the dust centrifuged in the casing 216". The skirt 292' includes an cut 296 which is partially cut out in a circumferential direction thereof in order to separate a dust larger than a space between the skirt 292' and the dust receptacle 270 by dropping the large dust through the cut 296. The skirt 292' includes a slant 298 sloping down toward the cut 296 along a circumference thereof. The slant 298 gradually lowers in a along the whirling movement. Therefore, the dust fallen on the skirt 292' is moved by the whirling air along the slant 298, and dropped when it reaches the cut 296. The grill member 291' of this embodiment is surely applicable to other embodiments previously described.

The operation of the cyclone dust collector 250" having the above structure will be described. Dust-laden air flows into the cyclone dust collector 250" past through the inlet **210*a*, the first tube 213 and the cyclone inlet 263. The air becomes a swirl by guidance of the air inducing wall 314, and flows into the casing 261". By the centrifugal force of the swirl, relatively large dust fall down from the air collected in the dust receptacle 270. The cleaned air is discharged to the second tube 215 past through the grill member 291' and the cyclone outlet 265**.

According to embodiments of the present invention, the cyclone dust collectors 250 and 250' can be used when the auxiliary suction tool 170 (FIG. 1) is connected to the handle assembly 200 since the cyclone dust collectors 250, 250' are integrally formed with the handle assembly 200.

Further, since the free ends of the cyclone dust collectors 250, 250' direct toward the downstream with respect to the handle pipe 210, use of the auxiliary suction tool 170 is not hindered by the dust receptacle 160 (FIG. 1). In addition, the cyclone dust collectors 250, 250' occupy less space than the conventional cyclone dust collector.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A handle assembly of a vacuum cleaner, comprising:

a handle pipe having an inlet connected to a suction port assembly so that an air can flow therethrough, and an outlet connected to a cleaner body so that the air can flow therethough;

a handle formed on the handle pipe for a user to grip; and a cyclone dust collector extending from the handle pipe to centrifugally separate dust from an external air suctioned in through the inlet of the handle pipe, and discharge clean air to the outlet of the handle pipe, and a free end of the cyclone dust collector extending towards the outlet of the handle pipe and away from the inlet.

2. The handle assembly of claim 1, wherein the handle pipe comprises:

a first tube connecting the inlet of the handle pipe and the cyclone dust collector to let the air through;

a second tube connecting the outlet of the handle pipe and the cyclone dust collector to let the air through; and a partition mounted in the handle pipe to separated the first and the second tubes from each other inside the handle pipe.

3. The handle assembly of claim 2, wherein the cyclone dust collector comprises:

a cyclone body connected to a side of the handle pipe, and having a cyclone inlet connected to the first tube, and a cyclone outlet connected to the second tube; and a dust receptacle removably connected to the cyclone body to form a cyclone chamber which is a space for centrifugal separation of the external air, and having an free end which directs toward the downstream with respect to the handle pipe along the suction path when the dust receptacle is connected to the cyclone body.

4. The handle assembly of claim 3, wherein the cyclone body comprises a casing having an open end connected with the dust receptacle, and forming a space for the cyclone chamber therein when being connected to the dust receptacle, and an inlet formed at one side of the casing is connected to the first tube through an inflow pipe so that the air flowed in the cyclone chamber is guided in a tangential direction to the casing.

5. The handle assembly of claim 4, comprising a grill member mounted in the casing to cover the cyclone outlet, the grill member comprising:

a substantially cylindrical grill body having a plurality of pores; and a skirt flanged around a bottom portion of the grill body, the skirt having a partial cut in a circumferential direction.

6. The handle assembly of claim 5, wherein the skirt has a slant sloping down toward the cut in the circumferential direction.

7. The handle assembly of claim 4, wherein the inlet is connected to the first tube by the inflow pipe, and the inflow pipe is formed such that a section area gradually narrows from the inlet connected to the first tube toward the outlet connected to the cyclone dust collector.

8. The handle assembly of claim 7, wherein the cyclone dust collector has a dust separation plate formed therein to divide the cyclone chamber into a first chamber and a second chamber.

9. The handle assembly of claim 8, wherein the cyclone body and the dust receptacle are disposed in a serial arrangement along a central axis which is sloped with respect to the handle pipe.

10. The handle assembly of claim 9, wherein the dust separation plate is mounted in the casing at a predetermined slope with respect to an inner circumference of the casing in the vicinity of the open end, and having an escape hole penetrating a side thereof such that the dust separated in the first chamber is discharged to the second chamber.

11. The handle assembly of claim 10, wherein the dust separation plate is slopingly mounted so that a side having the escape hole is nearer to the free end of the dust receptacle than the other side.

12. The handle assembly of claim 9, wherein the dust receptacle is mounted substantially in parallel with the second tube when connected to the cyclone body.

13. The handle assembly of claim 4, wherein the cyclone dust collector is partially bent such that a part thereof connected to the handle pipe and the free end of the dust receptacle are slopingly connected to each other.

14. The handle assembly of claim 13, wherein a part of the casing in the vicinity of the open end is bent.

15. The handle assembly of claim 14, wherein the cyclone dust collector comprises:

a dust separation plate which divides the cyclone chamber into a first chamber and a second chamber; and an escape hole for the dust separated in the first chamber to flow into the second chamber.

16. The handle assembly of claim 15, wherein the escape hole is penetratingly formed at a side of the dust separation plate, and the dust separation plate is slopingly mounted so that a side having the escape hole is nearer to the free end of the dust receptacle than the other side.

17. The handle assembly of claim 15, wherein the casing comprises:

a first casing connected to the handle pipe in a cantilever type; and a second casing connected to a free end of the first casing, the free end of the first casing is disposed in the second casing, and the dust separation plate covers the free end of the first casing in the second casing.

18. The handle assembly of claim 17, wherein the escape hole penetrates an outer circumference of the first casing which is connected to the dust separation plate, and disposed in the second casing, at a side of the outer circumference which is nearest to the free end of the dust receptacle.

19. The handle assembly of claim 18, wherein the first and the second casing, and the dust separation plate are integrally formed altogether.

20. The handle assembly of claim 14, wherein the dust receptacle is mounted in parallel with the second tube when connected to the cyclone body.

21. The handle assembly of claim 3, further comprising an assistant connection unit for connecting the dust receptacle to the handle pipe in a slidable and removable manner when the dust receptacle is connected to and separated from the casing.

22. The handle assembly of claim 21, wherein the assistant connection unit comprises:

a slide projection protruded from a side of one of the handle pipe and the dust receptacle; and a slide groove removably connected to the slide projection, and formed at a side of the other one of the handle pipe.

23. The handle assembly of claim 4, further comprising:

an inner casing mounted in the casing and connected to the cyclone outlet by an upper portion thereof; and a grill member connected to a bottom portion of the inner casing.

24. The handle assembly of claim 23, further comprising an air inducing wall disposed around outside of the inner casing to guide downward the air flowed in though the cyclone inlet of the cyclone body.

25. The handle assembly of claim 24, wherein the air inducing wall is spirally and gradually sloping down.

26. The handle assembly of claim 23, further comprising an insertion opening integrally formed with a top surface of the air inducing wall, for fitting in with the cyclone inlet.

27. The handle assembly of claim 23, wherein the grill member comprises:

a substantially cylindrical grill body having a plurality of pores; and a skirt flanged around a bottom portion of the grill body, the skirt having a partial cut in a circumferential direction.

28. The handle assembly of claim 27, wherein the skirt has a slant sloping down toward the cut in the circumferential direction.

29. The handle assembly of claim 3, wherein the dust receptacle further comprises a dust flow prevention member mounted therein.

30. The handle assembly of claim 29, wherein the dust flow prevention member comprises a board member protruded into the dust receptacle in a length direction of the dust receptacle, and is sloped in a manner that the protruded height increases toward the free end of the dust receptacle.

31. The handle assembly of claim 3, wherein the cyclone body and the dust receptacle are made of a transparent material.

32. The handle assembly of claim 3, wherein the cyclone body and the handle pipe are integrally formed.

33. The handle assembly of claim 1, wherein the handle pipe is fluidly communicated with the suction port assembly through the extension pipe, and with the cleaner body through the flexible hose.

34. A cyclone dust collector disposed on a suction path which connects a cleaner body having a vacuum generator and a suction port assembly for suctioning in dust from a cleaning surface, to centrifugally separate the air suctioned in through the suction port assembly, comprising:

a cyclone body formed at a handle assembly connecting an extension pipe which is connected to the suction port assembly and a flexible hose which is connected to the cleaner body; and a dust receptacle removably connected to the cyclone body, wherein an end of the dust receptacle extends toward the, flexible hose and away from the extension pipe.

35. The cyclone dust collector of claim 34, wherein the handle assembly comprises a handle pipe which connects the extension pipe and the flexible hose, and a handle formed on the handle pipe, and the handle pipe comprises a first tube connecting the extension pipe and a cyclone inlet, a second tube connecting the flexible hose and a cyclone outlet, and a partition mounted in the handle pipe to separate the first and the second tubes from each other inside the handle pipe.

36. The handle assembly of claim 1, wherein the cyclone dust collector extends parallel to the outlet of the handle pipe.

* * * * *